J. BRINKERHOFF.

WRINGER.

No. 6,816. Reissued Dec. 21, 1875.

Witnesses:

P. C. Dieterich.

Wm. Kupferman.

Inventor:

Jacob Brinkerhoff

Per: C. H. Watson & Co. Attorneys.

N. PETERS, PHOTO-LITHOGRAPHER, WASHINGTON, D. C.

UNITED STATES PATENT OFFICE.

JACOB BRINKERHOFF, OF AUBURN, NEW YORK, ASSIGNOR, BY MESNE ASSIGNMENTS, TO HIMSELF, CHARLES M. HOWLET, ELON C. DENIO, AND JOHN I. BRINKERHOFF.

IMPROVEMENT IN WRINGERS.

Specification forming part of Letters Patent No. 122,220, dated December 26, 1871; reissue No. 5,218, dated January 7, 1873; reissue No. 6,816, dated December 21, 1875; application filed December 16, 1875.

*To all whom it may concern:*

Be it known that I, JACOB BRINKERHOFF, of Auburn, in the county of Cayuga and State of New York, have invented certain new and useful Improvements in Wringing-Machines; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
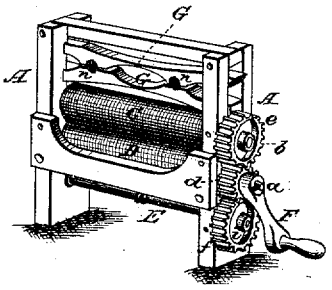
Figure 2:
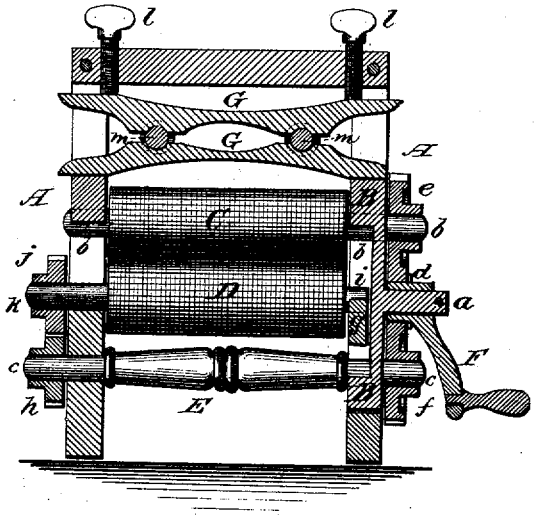
Figure 3:
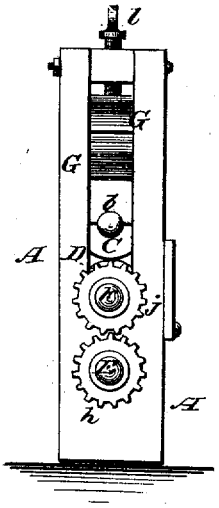
Figure 4:
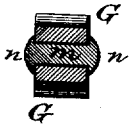

Figure 1 represents a perspective view of the wringer. Fig. 2 represents a vertical longitudinal section through the same. Fig. 3 represents an end elevation, viz., of that end of the wringer opposite to the crank-gear. Fig. 4 represents a section through the roller-springs, showing the device for holding them together.

Similar letters of reference, where they occur in the several separate figures, denote like parts in the drawing.

My invention consists, first, in the arrangement of the driving-gear, by which the rolls are turned while they yield to allow the material to pass through between them; also, in operating the upper roll from the crank end, in order to obtain a greater purchase, and in the combination and arrangement of parts, as hereinafter more fully described, and pointed out by the claims.

To enable others skilled in the art to make and use my invention I will proceed to describe the same with reference to the drawing.

A A represent the side-pieces of the wringer, which are slotted down to receive the journals of the rolls and their supports, as also to receive a box or frame, B, to which the journals *a b c* of the gears *d e f* are so connected or attached that they cannot get out of gear, however much the upper roll may rise from the under one. The rolls, of which C is the upper and D the under one, are covered with rubber, in the usual well-known way. The journal *b* of the upper roll passes through the box B, and has fastened upon it, outside of said box, the gear-wheel *e*. The journal *i* of the under roll is not connected with the box B, but is supported and turns upon a bearing, *g*, which is on, or a part of, the frame A. The journal *a*, upon which the purchase-pinion *d* is hung and turns, is cast or wrought onto the box B, and the journal *c*, on which the gear *f* is permanently fixed, is a prolongation of a counter-shaft, E, which extends clear across the wringer, and has upon its opposite end from the gear *f* a gear, *h*, which meshes with a gear, *j*, fast upon the journal *k* of the under roll D, and gives said under roll its revolving motion. The crank F, for cheapness and economy, is cast upon, and as a part of, the purchase-pinion *d*, and both the pinion and crank turn on the journal *a*, cast upon or otherwise fastened to the box B. By uniting the journals *a b c* to the box B their wheels *d e f* cannot, of course, ever get out of gear; but as the under roll D has no connection with this box B, said box and the upper roll can leave the under roll, and form sufficient space for any practical thickness of clothes to pass through. By driving the upper roll C from the crank end I am enabled to use a purchase-pinion, *d*, of reduced size, thus gaining purchase, and requiring less power to operate the machine. The under roll is turned through the gear *f*, counter-shaft E, and gears *h j*, so that its motion is not stopped when the train of gears *d e f* rise up without raising said under roll.

The advantages of this mode of gearing are, first, it does not tear or twist off the rubber covering of the rolls; second, the gears cannot separate; and, third, the great amount of space between the rolls for the passage of the clothes.

By locating the purchase-pinion opposite the end of the lower roll I am enabled to make a cheaper, more compact and practical wringer than if located anywhere else; for if placed elsewhere it must be either above the upper roll, below the lower roll, or out on one side of the wringer-frame. If above the upper roll the strain and purchase of the crank will tend more to break the clamp and tip the tub. If below the lower roll it must be far enough below it to place an intermediate gear between it and the gear of the lower roll, in order to turn the lower roll in the right direction, and making it necessary to increase the length of the wringer-frame, making the wringer more expensive to manufacture and cumbersome to handle, and as wringers are handled mostly by women it is necessary to have them as compact and light as possible consistent with strength and durability. If the purchase-gear is placed out on one side of the wringer-frame there must be an extra frame built to support it.

Having thus fully described my invention, what I claim as new, and desire to secure by Letters Patent, is—

1. The combination of two rolls and suitable connecting mechanism with a counter-shaft, having a fixed journal at one side of the frame, and a sliding journal at the other.

2. The combination of the rolls C and D, arranged with gearing and sliding boxes and journals, to allow one or both ends of the rolls to be separated without changing the relative position of the gearing.

3. The combination of the train of gears *d e f* with the box B, so that they shall always move together, and consequently be always in gear with each other, while they move up and down with the upper or yielding one of the pair of rolls, substantially as described.

4. In combination with the train of gears and the under roll detached from the box B, the counter-shaft E and gears *h j*, for driving said under roll, substantially as described.

5. The upper roll C, driven from the crank end by a pinion of smaller size than the pinion upon the shaft of roll C, and the lower roll D, driven from the opposite end by suitable connecting mechanism to obtain the required purchase, substantially as and for the purpose set forth.

6. In combination with the rubber rolls C D, the purchase-pinion *d*, located opposite the end of the lower roll D, and revolving independently of said lower roll, with suitable mechanism for imparting motion to the rolls, for the purpose set forth.

7. The combination of the rollers C and D and the purchase-pinion *d*, arranged to accommodate itself to the up-and-down movement of either roll, for the purposes set forth.

In testimony that I claim the foregoing I have hereunto set my hand this 15th day of December, 1875.

JACOB BRINKERHOFF.

Witnesses:
WM. B. UPPERMAN,
C. H. WATSON.